(12) United States Patent  (10) Patent No.: US 11,292,537 B2
Noguchi et al.  (45) Date of Patent: Apr. 5, 2022

(54) SADDLE-RIDING TYPE VEHICLE AND SIDE STAND BRACKET

(71) Applicant: HONDA MOTOR CO., LTD., Tokyo (JP)

(72) Inventors: Yuji Noguchi, Wako (JP); Yoshihito Tokuda, Wako (JP); Kazuki Seri, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 294 days.

(21) Appl. No.: 16/548,887

(22) Filed: Aug. 23, 2019

(65) Prior Publication Data

US 2020/0070910 A1  Mar. 5, 2020

(30) Foreign Application Priority Data

Aug. 31, 2018 (JP) .............................. JP2018-163707

(51) Int. Cl.
*B62H 1/02* (2006.01)
*B62J 25/00* (2020.01)

(52) U.S. Cl.
CPC ................ *B62H 1/02* (2013.01); *B62J 25/00* (2013.01)

(58) Field of Classification Search
CPC .................................. B62H 1/02; B62J 25/00
USPC ................................................ 180/293, 301
See application file for complete search history.

(56) References Cited

U.S. PATENT DOCUMENTS

| 5,507,200 | A | * | 4/1996 | Reed | B62H 1/02 280/291 |
|---|---|---|---|---|---|
| 6,276,707 | B1 | | 8/2001 | Ungvari | |
| 8,302,984 | B2 | * | 11/2012 | Kudo | B62H 1/02 280/301 |
| 9,598,132 | B2 | * | 3/2017 | Eguchi | B62K 19/12 |
| 10,351,191 | B2 | * | 7/2019 | Koishikawa | B62H 1/02 |
| 10,899,411 | B2 | * | 1/2021 | Kojika | B62K 23/08 |
| 2008/0252041 | A1 | | 10/2008 | Safarik et al. | |

FOREIGN PATENT DOCUMENTS

| CN | 2185711 | 12/1994 | |
|---|---|---|---|
| DE | 102008014793 | 10/2008 | |
| EP | 3281849 | 2/2018 | |
| EP | 3281849 A1 * | 2/2018 | ............... B62H 1/02 |
| JP | 64-78988 | 3/1989 | |

(Continued)

OTHER PUBLICATIONS

Indian Office Action for Indian Patent Application No. 201914034484 dated Sep. 17, 2020.

(Continued)

*Primary Examiner* — Minnah L Seoh
*Assistant Examiner* — Hosam Shabara
(74) *Attorney, Agent, or Firm* — Amin, Turocy & Watson, LLP (57) ABSTRACT

A saddle-riding type vehicle includes a vehicle body frame, a side stand bracket provided at a lower portion of one side of the vehicle body frame in a vehicle width direction, and a side stand supported by the side stand bracket, in which the side stand bracket includes a stand connecting portion to which a base end portion of the side stand is rotatably connected, and a protecting portion which is provided in front of the stand connecting portion in the vehicle and protects the base end portion of the side stand.

14 Claims, 10 Drawing Sheets

(56) References Cited

FOREIGN PATENT DOCUMENTS

| | | |
|---|---|---|
| JP | 04-035982 | 3/1992 |
| JP | 11-334661 | 12/1999 |
| JP | 2006-298375 | 11/2006 |
| JP | 2008-062720 | 3/2008 |
| JP | 2010-228565 | 10/2010 |
| JP | 2012-240591 | 12/2012 |
| JP | 2018-027771 | 2/2018 |

OTHER PUBLICATIONS

Japanese Office Action for Japanese Patent Application No. 2018-163707 dated Apr. 7, 2020.
German Office Action for German Patent Application No. 102019212742.8 dated Jul. 9, 2020.

* cited by examiner

SADDLE-RIDING TYPE VEHICLE AND SIDE STAND BRACKET

CROSS-REFERENCE TO RELATED APPLICATION

Priority is claimed on Japanese Patent Application No. 2018-163707, filed Aug. 31, 2018, the content of which is incorporated herein by reference.

BACKGROUND OF THE INVENTION

Field of the Invention

The present invention relates to a saddle-riding type vehicle and a side stand bracket.

Description of Related Art

Conventionally, a side stand is generally provided on a lower left side of a vehicle body frame of a motorcycle. For example, as shown in Japanese Unexamined Patent Laid-Open No. 2008-62720 (hereinafter referred to as Patent Document 1), a side stand is supported on a vehicle body frame via a side stand bracket. The side stand bracket is fixed to a left lower pipe provided on a lower left side of the vehicle body frame. The side stand has a rod shape with its base end portion pivotally connected to the side stand bracket via a pivot shaft and is supported at a rear portion of a side of a vehicle body due to the tension of a return spring when traveling.

In a motorcycle, for example, when traveling off road, a lower side of a vehicle body may collide with the ground and obstacles such as rocks, stones and shrubs protruding from the ground. For this reason, for example, Patent Document 1 discloses a structure in which, when a step of a motorcycle comes into contact with the ground and the step is folded toward a rear side thereof in reaction, the step prevents dirt and foreign matters from getting stuck between the step and a step bracket and easily returns to its original position.

SUMMARY OF THE INVENTION

The side stand bracket as mentioned above also extends to project obliquely downward from the left lower pipe. For this reason, if the vehicle body of the motorcycle is greatly inclined during cornering, an outer side of the base end portion of the side stand may come into contact with the ground. In addition, during off-road travel or the like, the outer side of the base end portion of the side stand may collide with the ground and obstacles. Such interference from obstacles during travel of the motorcycle causes wear and damage at the base end portion of the side stand and causes rattling at the base end portion of the side stand. As a result, there is concern of the side stand excessively swinging and coming into contact with vehicle body components such as a swing arm or requiring replacement of the components.

Aspects of the present invention have been made in view of such circumstances, and an object of the present invention is to provide a saddle-riding type vehicle and a side stand bracket which can inhibit wear and damage of a base end portion of a side stand.

In order to solve the above problems, the present invention adopts the following aspects.

A saddle-riding type vehicle according to an aspect of the present invention includes a vehicle body frame, a side stand bracket provided at a lower portion of one side of the vehicle body frame in a vehicle width direction, and a side stand supported by the side stand bracket, and the side stand bracket includes a stand connecting portion to which a base end portion of the side stand is pivotably connected, a spring engaging portion configured to hold a tip portion of the side stand via a biasing member at a rear portion of a side of a vehicle body above the base end portion, and a protecting portion which is provided in front of the stand connecting portion and protects the base end portion of the side stand.

(2) In the above aspect (1), the protecting portion may protrude outward in the vehicle width direction from a side surface portion of the side stand bracket and may be provided in a wall shape which overlaps the base end portion of the side stand when viewed from a front side of the vehicle.

(3) In the above aspect (1) or (2), the saddle-riding type vehicle may include a step on which a rider's foot is placed and a step bracket supporting the step, and the side stand bracket may have a stand bracket main body that is integral with the step bracket.

In any one of the above aspects (1) to (3), the saddle-riding type vehicle may include a step on which a rider's foot is placed and a step bracket supporting the step, the step bracket may include a step support portion supporting the step in front of the base end portion of the side stand, the base end portion of the side stand may have a projecting portion which does not overlap the step and the step support portion when viewed from the front side of the vehicle, and the protecting portion may protect the projecting portion.

(5) In any one of the above aspects (1) to (4), the saddle-riding type vehicle may include a step on which a rider's foot is placed, a pivot shaft of the side stand may be disposed below an upper surface of the step and inside the step in the vehicle width direction when viewed from the front side of the vehicle, and an extension line of a central axis of the pivot shaft may be inclined at an angle within a range intersecting the upper surface of the step.

A side stand bracket according to another aspect of the present invention is a side stand bracket provided on a vehicle body frame of a saddle-riding type vehicle, which includes a stand connecting portion to which a base end portion of a side stand is rotatably connected, and a protecting portion which is provided in front of the stand connecting portion when attached to the vehicle body frame and protects the base end portion of the side stand connected to the stand connecting portion.

According to the above aspects (1) and (6), by providing the protecting portion for protecting the base end portion of the side stand in front of the stand connecting portion, the base end portion of the side stand is protected from disturbances from the front side of the vehicle. Accordingly, it is possible to inhibit the base end portion of the side stand from being worn or damaged by disturbances from the front side of the vehicle.

According to the above aspect (2), by providing the protecting portion in the wall shape overlapping the base end portion of the side stand in a front view, the base end portion of the stand connecting portion and the side stand can be reliably protected.

According to the above aspect (3), the number of components can be reduced by providing the stand bracket main body and the step bracket integrally.

According to the above aspect (4), the base end portion of the side stand can be efficiently protected by protecting the projecting portion at the base end portion of the side stand, which avoids the step and the step support portion in a front view, with the protecting portion of the step bracket.

According to the above aspect (5), an inclination of the pivot shaft relative to the horizontal direction is limited by inclining the pivot shaft of the side stand at an angle within a range in which the central axis intersects the upper surface of the step. Therefore, a pivoting trajectory of the side stand is inhibited from excessively intruding into the vehicle body side when the side stand is folded up, so that the nearing of the side stand toward the vehicle body side can be inhibited even in the case in which a folding angle of the side stand is set to be larger.

DETAILED DESCRIPTION OF THE INVENTION

Hereinafter, embodiments of the present invention will be described with reference to the drawings. Directions such as forward, rearward, left, and right in the following description are the same as the directions in the vehicle described below unless otherwise specified. An arrow FR indicating a front side of the vehicle, an arrow LH indicating a left side of the vehicle, and an arrow UP indicating an upper side of the vehicle are shown at appropriate positions in the drawings used for the following description.

<Overall Vehicle>

Figure 1:
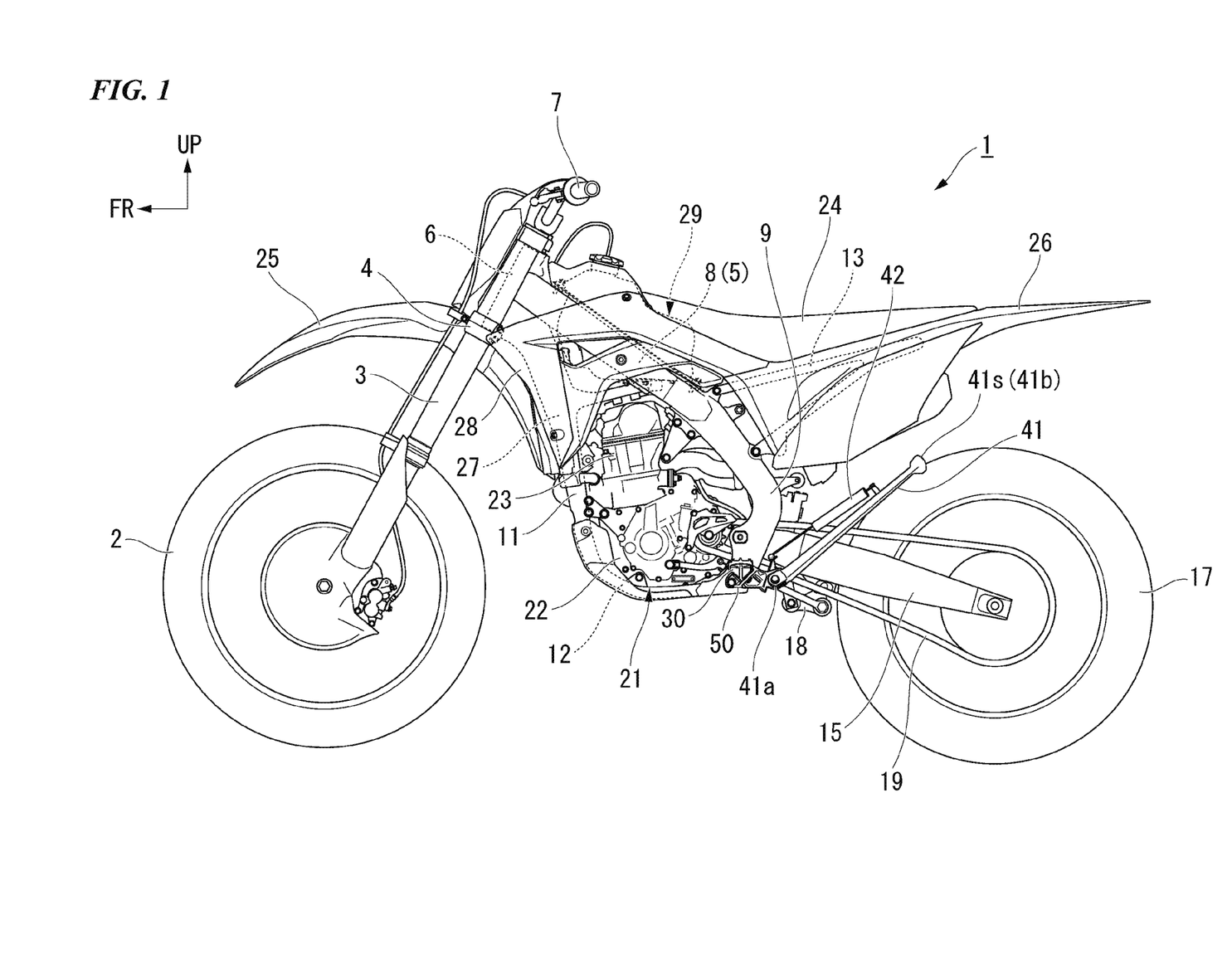
FIG. 1 is a left side view of a motorcycle according to an embodiment of the present invention.

FIG. 1 shows an off-road type motorcycle 1 as an example of a saddle-riding type vehicle. A front wheel 2 of the motorcycle 1 is pivotally supported by lower end portions of left and right front forks 3. Upper portions of the left and right front forks 3 are steerably supported by a head pipe 6 of a vehicle body frame 5 via a steering stem 4. A bar-type handlebar 7 is mounted on a top bridge of the steering stem 4.

The vehicle body frame 5 includes the head pipe 6, a pair of left and right main tubes 8, a pair of left and right pivot frames 9, a single down frame 11, a pair of left and right lower frames 12, and a seat frame 13.

In a side view, the head pipe 6 obliquely extends such that its rear side is positioned upward.

The left and right main tubes 8 extend in a rearward direction downward from a rear upper portion of the head pipe 6.

Rear end portions of the left and right main tubes 8 are connected to upper end portions of the left and right pivot frames 9 at an intermediate portion of a vehicle body in the front to rear direction.

The single down frame 11 extends obliquely in the rearward direction downward from a rear lower portion of the head pipe 6 while forming an inclination steeper than that of the left and right main tubes 8.

The left and right lower frames 12 branch from a lower end portion of the down frame 11 to the left and right and extend obliquely downward in the rearward direction. Lower portions of the left and right lower frames 12 are curved rearward. Rear portions of the left and right lower frames 12 are connected to lower end portions of the left and right pivot frames 9.

The seat frame 13 is connected to rear portions of the left and right main tubes 8.

The vehicle body frame 5 forms a twin spar type cradle frame. An engine 21 is mounted in an internal portion of the vehicle body frame 5 as a prime mover of the motorcycle 1.

The term "intermediate" used in the present embodiment is meant to include not only a center between both ends of an object but also an inside range between both ends of the object.

A front end portion (base end portion) of a swing arm 15 is vertically pivotably supported by the lower portions of the left and right pivot frames 9. A rear wheel 17 of the motorcycle 1 is pivotally supported at a rear end portion of the swing arm 15. A lower end portion of a rear cushion (not shown) is connected to a front lower portion of the swing arm 15 via a link mechanism 18. An upper end portion of the rear cushion is connected to a cross member (not shown) crossing between the vicinities of the rear end portions of the left and right main tubes 8.

The engine 21 is a single cylinder engine having a crankshaft parallel to a vehicle width direction (the left to right direction). A lower portion of the engine 21 forms a crankcase 22. A cylinder 23 is provided to stand upright substantially vertically at a front upper portion of the crankcase 22.

A throttle body (not shown) of an engine intake system is connected to a rear portion of the cylinder 23. An exhaust pipe (not shown) of an engine exhaust system is connected to a front portion of the cylinder 23.

The rear portion of the crankcase 22 also serves as a transmission case that accommodates a clutch and a transmission. An output shaft of the transmission protrudes leftward from the rear portion of the crankcase 22. The output shaft and the rear wheel 17 are connected via a chain type drive mechanism 19.

A fuel tank 29 is provided between the left and right main tubes 8 above the cylinder 23. A seat 24 is provided on the seat frame 13 behind the left and right main tubes 8. The seat 24 extends in the front to rear direction. A front portion of the seat 24 is supported on an upper surface of a rear portion of the fuel tank 29.

In the figures, a reference numeral 25 denotes a front fender supported by a bottom bridge of the steering stem 4, a reference numeral 26 denotes a rear fender extending rearward behind the seat 24, a reference numeral 27 denotes a pair of left and right radiators disposed on both sides of the down frame 11, a reference numeral 28 denotes a pair of left and right shrouds covering respective ranges from side surfaces of the fuel tank 29 to front sides of side surfaces of the left and right radiators 27, and a reference numeral 30 denotes a pair of left and right steps which are disposed outside the lower end portions of the left and right pivot frames 9 and on which a driver's feet are placed.

<Side Stand>

Figure 2:
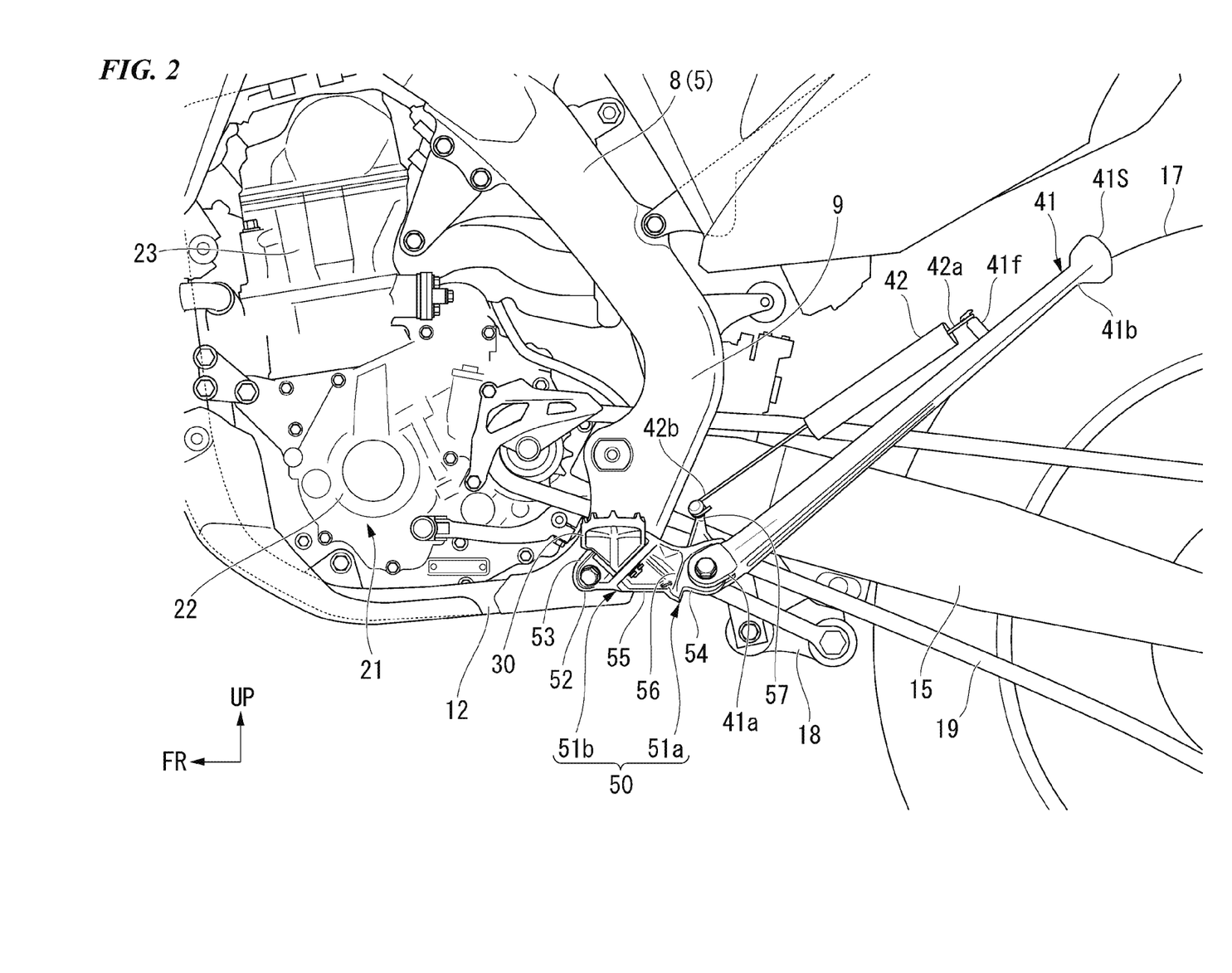
FIG. 2 is a left side view showing the surroundings of a side stand of the motorcycle.
Figure 3:
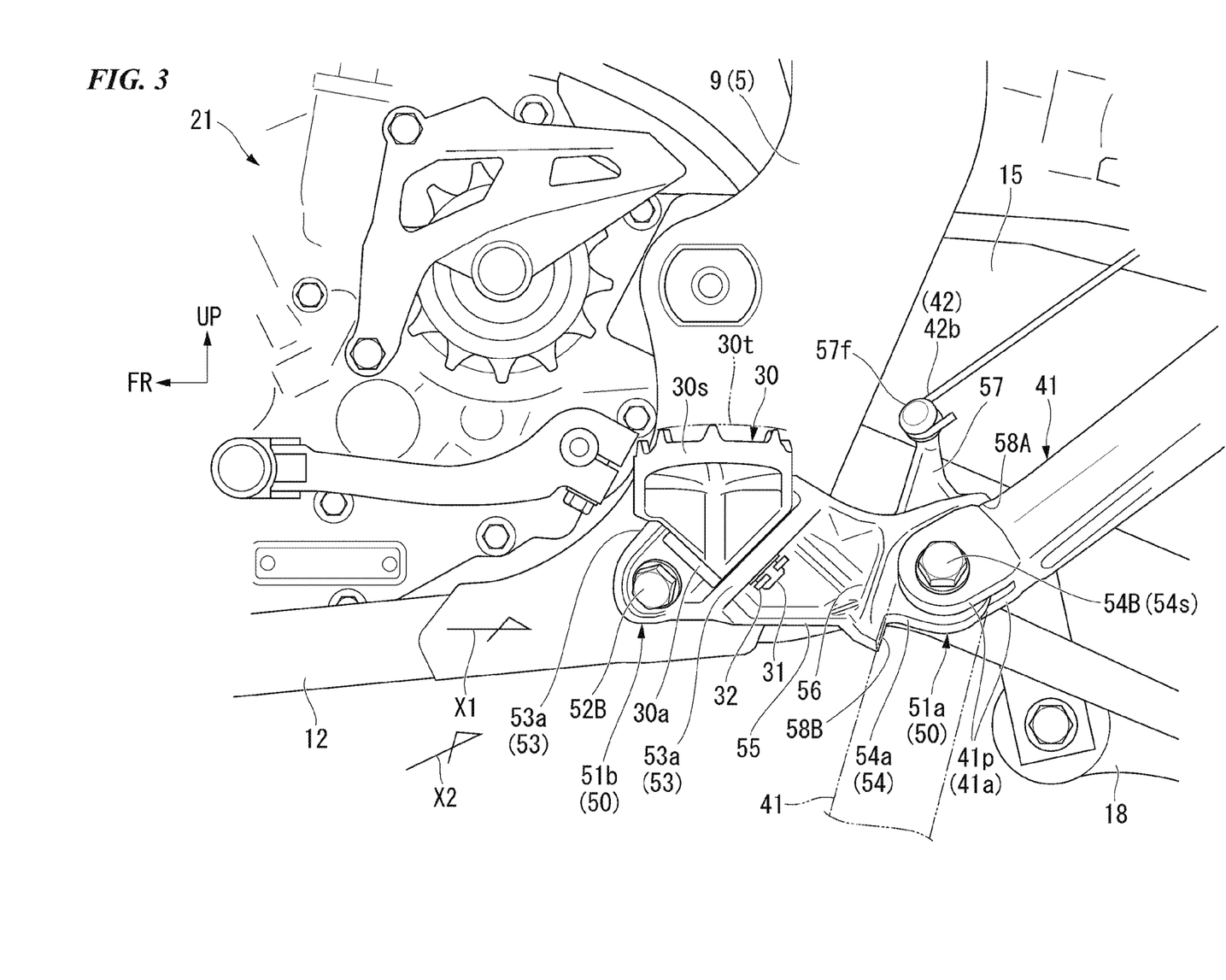
FIG. 3 is a left side view showing the surroundings of a side stand bracket of the motorcycle.
Figure 4:
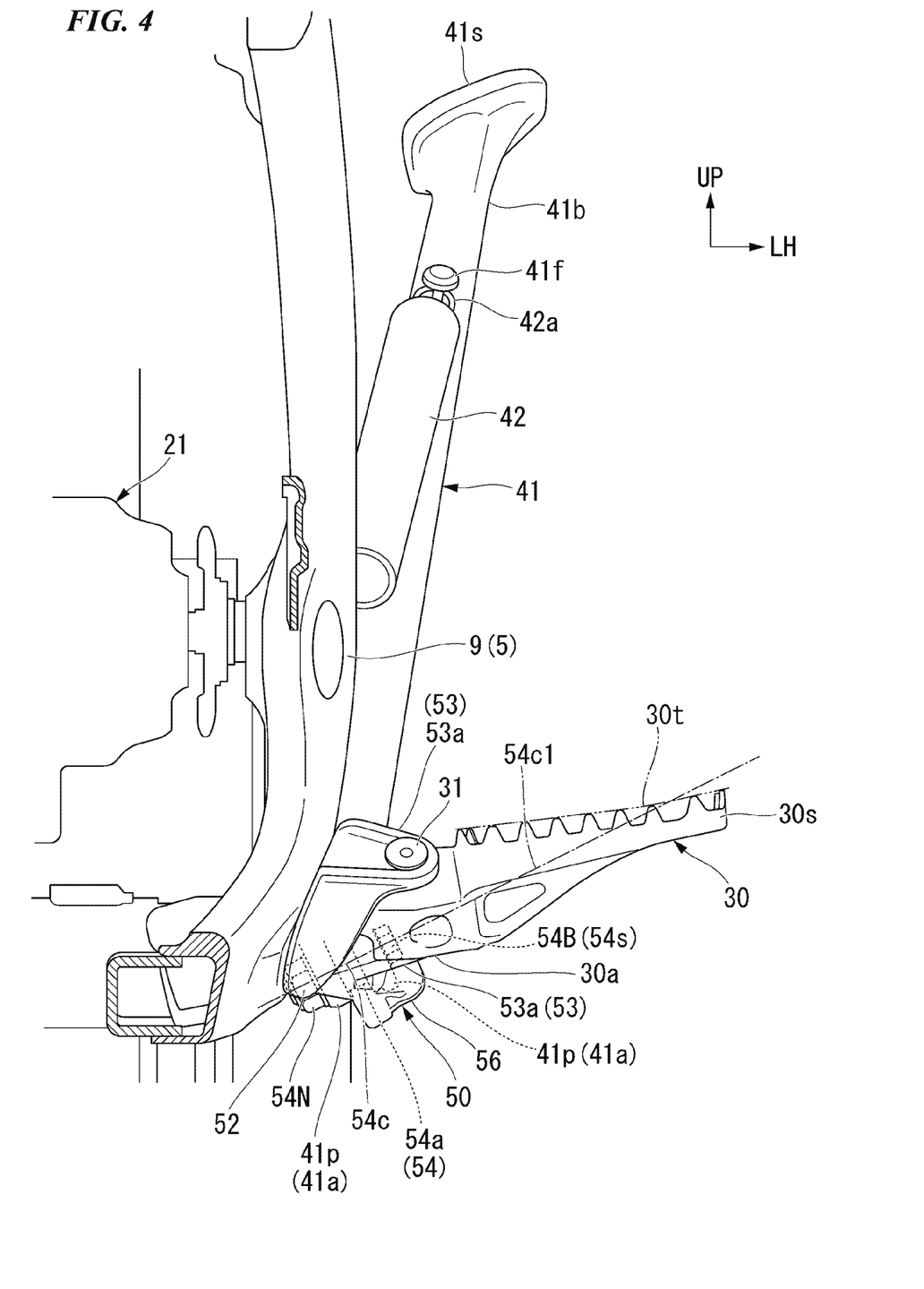
FIG. 4 is an explanatory view showing the surroundings of the side stand bracket from a front side of a vehicle.

As shown in FIGS. 2 to 4, a foldable side stand 41 that supports the vehicle body of the motorcycle 1 in a state where the vehicle body is inclined to the left is provided behind the lower end portion of the left pivot frame 9.

The side stand 41 is supported by the lower end portion of the left pivot frame 9 via a side stand bracket 50. A state (indicated by a solid line in the figures) in which the side stand 41 has been rotated upward in the rearward direction until it abuts a first stopper 58A of the side stand bracket 50 is a retracted state. A state (indicated by a dotted line in the figures) in which the side stand 41 has been rotated downward until it abuts a second stopper 58B of the side stand bracket 50 is a standing state. The side stand 41 can be held in the retracted state or the standing state due to a biasing force of a return spring (a biasing member) 42.

The side stand 41 is made of, for example, a metal material such as an aluminum alloy. The base end portion 41*a* of the side stand 41 is pivotably connected to the side stand bracket 50. The base end portion 41*a* of the side stand 41 forms a forked shape that sandwiches a plate-shaped stand connecting portion 54 of the side stand bracket 50 in the plate thickness direction. The base end portion 41*a* includes a pair of plate portions 41*p*. The pair of plate portions 41*p* are provided in parallel with each other at intervals in a direction intersecting an extending direction of the side stand 41. A shaft insertion hole (not shown) through which a pivot shaft 54*s* is inserted is formed in each plate portion 41*p*.

A ground contact portion 41*s*, which comes into contact with the ground when the vehicle stops, is integrally provided at a tip portion 41*b* of the side stand 41, for example, by integral molding. In the side stand 41, for example, a spring locking pin 41*f* is provided at a side closer to the tip portion 41*b* than a central portion thereof in the extending direction. One end 42*a* of the return spring 42 is locked to the spring locking pin 41*f*. The return spring 42 is, for example, a tension coil spring, and the other end 42*b* thereof is locked to a spring locking portion 57 provided on the side stand bracket 50, for example.

<Side Stand Bracket>

The side stand bracket 50 rotatably supports the base end portion 41*a* of the rod-shaped side stand 41 via the pivot shaft 54*s*. The side stand bracket 50 is attached to the lower end portion of the left pivot frame 9. The side stand bracket 50 is made of, for example, a metal material such as an aluminum alloy. The side stand bracket 50 integrally has a stand bracket main body 51*a* for supporting the side stand 41 and a step bracket 51*b* for supporting the left step 30, for example, provided by integral molding.

Referring also to FIGS. 5 to 8, the side stand bracket 50 includes a frame fixing portion 52, a step support portion 53, the stand connecting portion 54, an extension portion 55, and the spring locking portion 57.

The frame fixing portion 52 has a plate shape, and is provided at the lower portion of the left pivot frame 9 along a surface of the frame facing the outer side (left side) in the vehicle width direction. The frame fixing portion 52 fastens and fixes a front portion of the side stand bracket 50 to the left pivot frame 9 of the vehicle body frame 5. The frame fixing portion 52 has a pair of upper and lower bolt insertion holes 52*h* penetrating in the vehicle width direction. A mounting bolt 52B is inserted through each bolt insertion hole 52*h* and is screwed into each female screw hole (not shown) formed in the left pivot frame 9. Thus, the frame fixing portion 52 and the side stand bracket 50 are fastened and fixed to the left pivot frame 9.

The step support portion 53 is provided at a front portion of the side stand bracket 50. The step support portion 53 has a pair of front and rear support plates 53*a* provided on front and rear sides of the frame fixing portion 52. The frame fixing portion 52 and the step support portion 53 constitute the step bracket 51*b*.

Each support plate 53*a* has a plate shape substantially perpendicular to the plate-shaped frame fixing portion 52, and is provided to stand upright from the frame fixing portion 52 to the outer side (left side) in the vehicle width direction. A shaft insertion hole 53*h* through which a step support shaft 31 is inserted is formed in each support plate 53*a*. A base end portion 30*a* of the step 30 is inserted into a space between the front and rear support plates 53*a*. A through hole (not shown) through which the step support shaft 31 is inserted is formed in the base end portion 30*a* of the step 30.

The single step support shaft 31 is inserted through the shaft insertion holes 53*h* of the front and rear support plates 53*a* and the through holes of the step 30, and a locking mechanism is provided by, for example, passing a split pin 32 (see FIG. 3) through the tip portion of the shaft. Thus, the step 30 is pivotally coupled to and supported by the step support portion 53 around the step support shaft 31.

Figure 5:
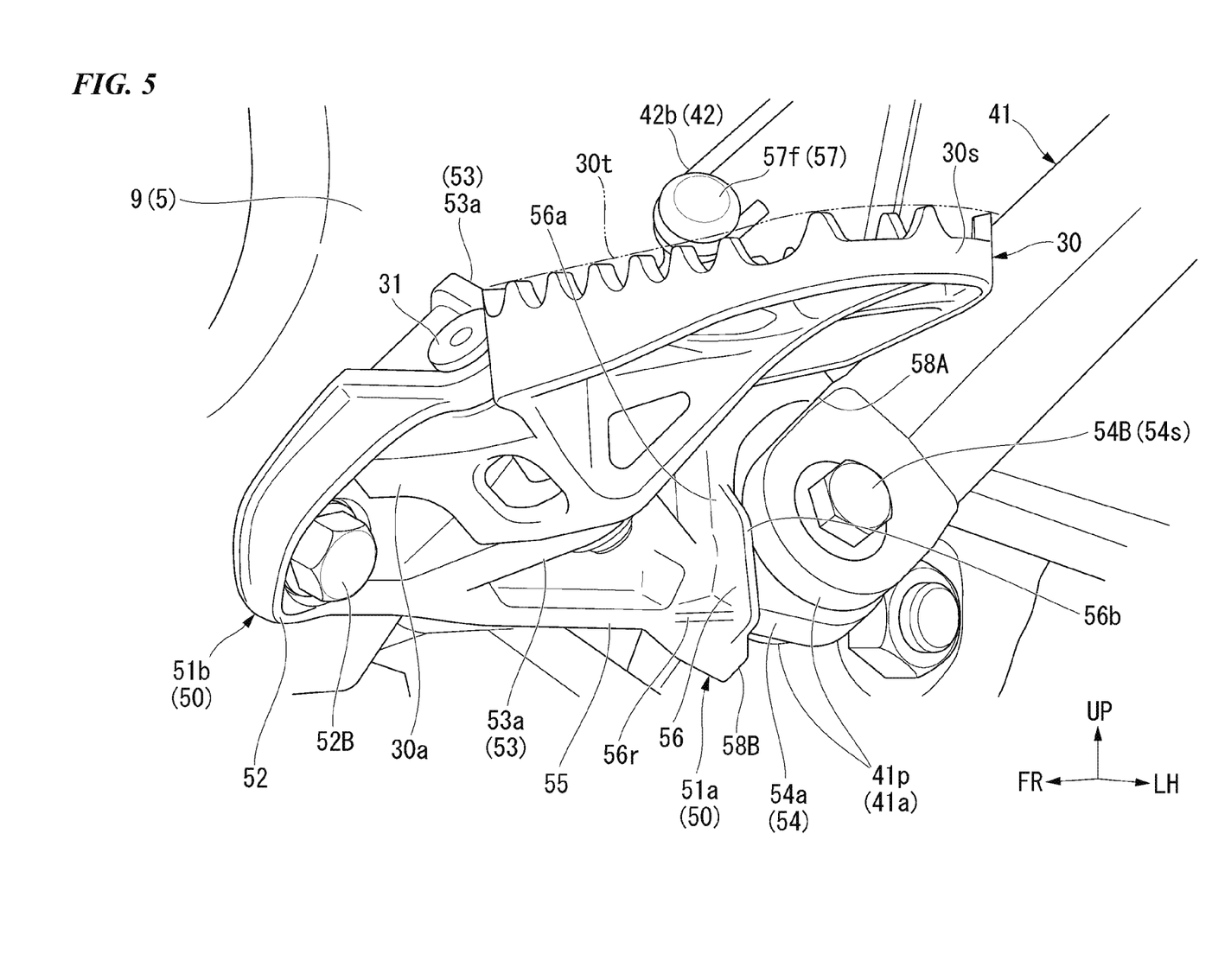
FIG. 5 is a perspective view of the side stand bracket from a front left side thereof

As shown in FIGS. 3 to 5, in the step 30 supported by the step support portion 53, the base end portion 30*a* abuts the frame fixing portion 52 between the front and rear support plates 53*a*. With the base end portion 30*a* of step 30 in contact with the frame fixing portion 52, an upper surface 30*t* (indicated by an imaginary line in the figures) of the step 30 is disposed substantially in the horizontal direction and faces upward.

In the step support shaft 31 inserted into the shaft insertion holes 53*h* of the support plates 53*a*, an axial direction thereof is parallel to a plane orthogonal to the left to right direction (vehicle width direction) and is inclined downward in the rearward direction. The foldable step 30 can be pivoted around the step support shaft 31 from a state in which the base end portion abuts the frame fixing portion 52 to make the upper surface 30*t* substantially horizontal and to fold a tip portion 30*s* thereof obliquely upward in the rearward direction.

Referring to FIGS. 5 to 8 together, the stand connecting portion 54 is provided at a rear portion of the side stand bracket 50. The stand connecting portion 54 is provided on a rear side of the extension portion 55 extending from the frame fixing portion 52 in the rearward direction of the vehicle. The stand connecting portion 54 has a plate-shaped support plate portion 54*a* inserted into the base end portion 41*a* of the side stand 41. The support plate portion 54*a* is inclined to position the plate thickness direction upward toward the outer side in the vehicle width direction. The frame fixing portion 52 is provided substantially in parallel with a plane orthogonal to the vehicle width direction, and the plate thickness direction thereof is directed in the vehicle width direction. The extension portion 55 has a twisted shape, and connects the frame fixing portion 52 and the stand connecting portion 54 (support plate portion 54*a*). The stand connecting portion 54 constitutes the stand bracket main body 51*a*.

As shown in FIGS. 4 and 5, the side stand 41 is rotatably connected by a pivot bolt 54B with the support plate portion 54*a* inserted between the pair of plate portions 41*p* of the base end portion 41a. The pivot bolt 54B is, for example, a stepped bolt having a shaft serving as the pivot shaft 54s. The pivot bolt 54B is inserted from the outside in the vehicle width direction into the shaft insertion holes (not shown) of the plate portions 41p of the side stand 41 and a pivot insertion hole 54h of the stand connecting portion 54 (support plate portion 54a). By screwing and tightening a nut 54N (see FIG. 4) into a tip screw portion of the pivot bolt 54B on the inner side in the vehicle width direction, the base end portion 41a of the side stand 41 is rotatably connected to and supported on the stand connecting portion 54 around the pivot shaft 54s of the pivot bolt 54B.

As shown in FIG. 4, when viewed from the front side of the vehicle, the pivot bolt 54B including the pivot shaft 54s of the side stand 41 is inclined to be positioned upward toward the outer side in the vehicle width direction in the range in which the central axis Mc is 25° to 40° relative to the horizontal direction.

When viewed from the front side of the vehicle, the pivot shaft 54s is disposed below the upper surface 30t of the step 30 and inside the step 30 in the vehicle width direction. When viewed from the front side of the vehicle, the pivot shaft 54s is inclined at an angle within a range in which an extension line 54c1 of the central axis 54c intersects the upper surface 30t of the step 30. Thus, an inclination of the pivot shaft 54s relative to the horizontal direction is limited. If the inclination of the pivot shaft 54s relative to the horizontal direction increases, the side stand 41 easily approaches the vehicle body side when the side stand 41 is folded up, and thus a limitation on the folding angle of the side stand 41 occurs.

If the folding angle of the side stand 41 is limited, there is a problem that the side stand 41 easily comes into contact with the ground during traveling. However, by laying the inclination of the pivot shaft 54s as low as possible (closer to the horizontal direction), the folding angle of the side stand 41 can be easily secured.

Figure 6:
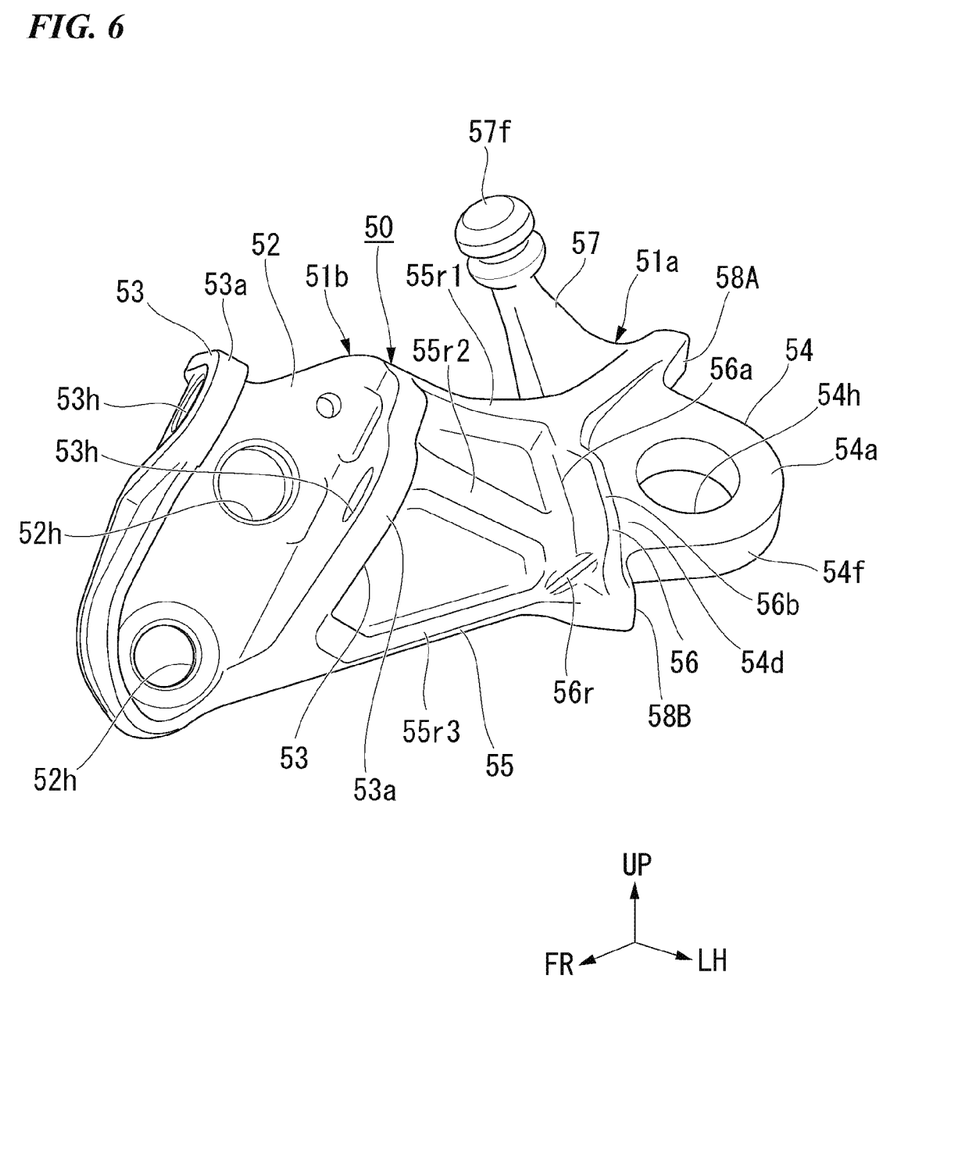
FIG. 6 is a perspective view of the side stand bracket.
Figure 7:
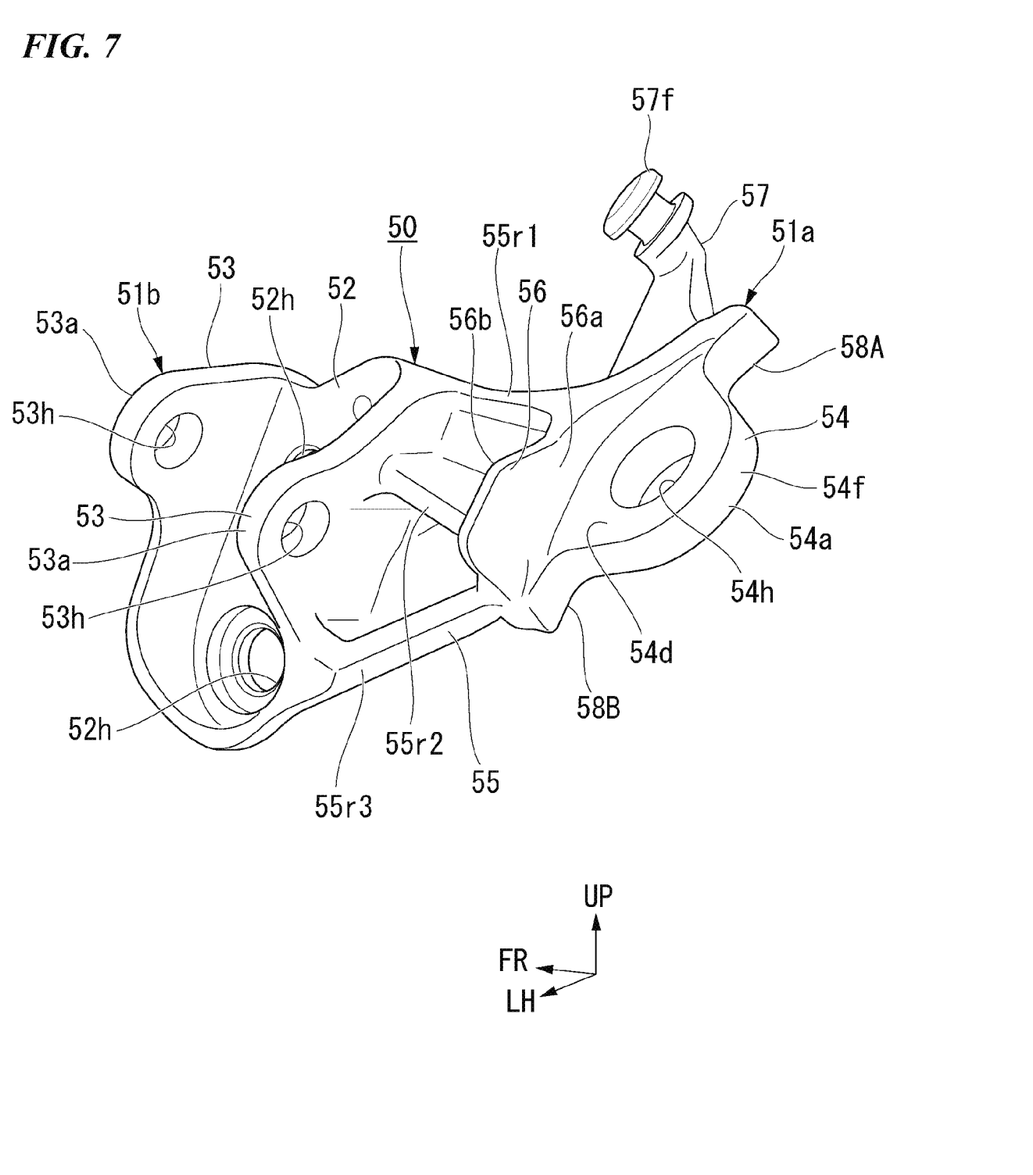
FIG. 7 is a perspective view of the side stand bracket at an angle different from that of FIG. 6.
Figure 8:
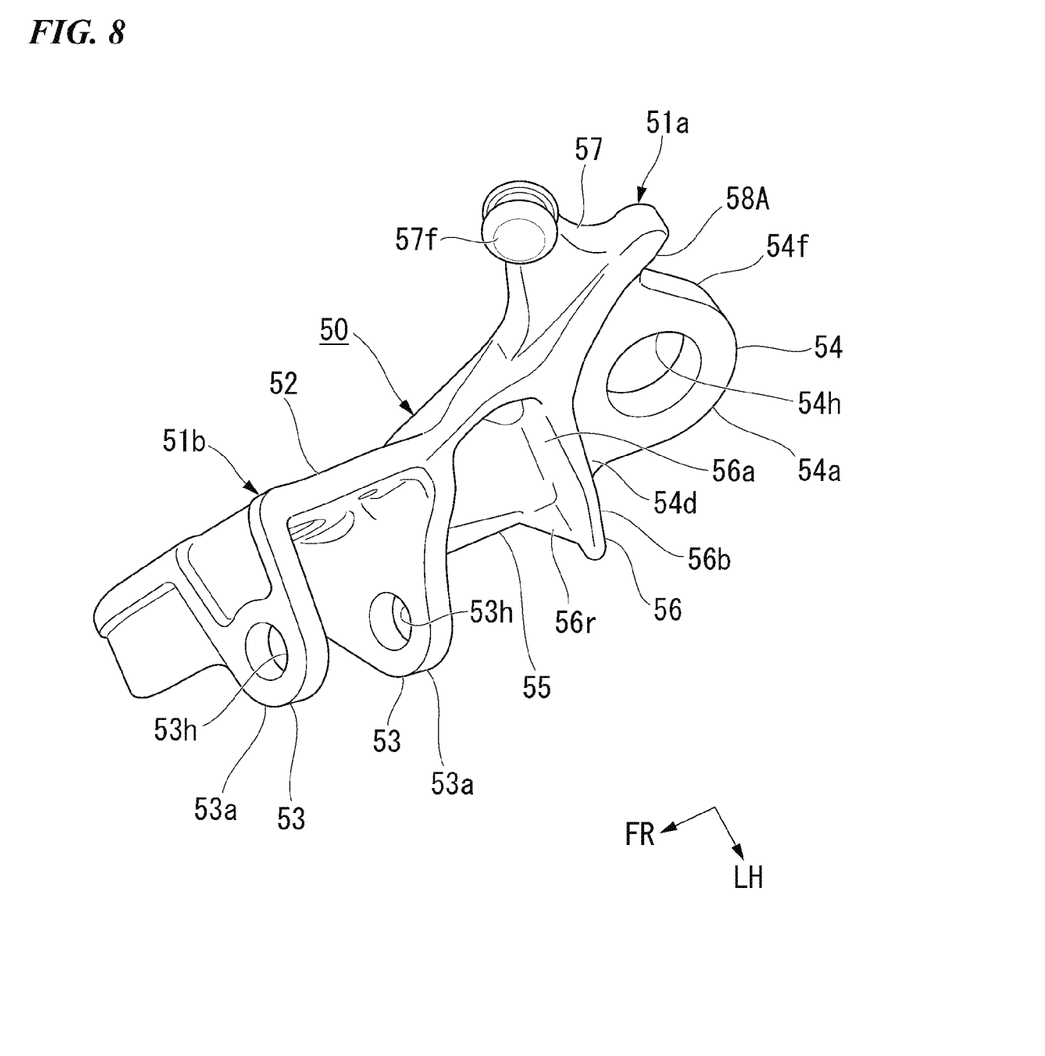
FIG. 8 is a perspective view of the side stand bracket at an angle different from those of FIGS. 6 and 7.

As shown in FIGS. 6 to 8, the stand connecting portion 54 has a first stopper 58A and a second stopper 58B. The first stopper 58A restricts a pivoting angle of the side stand 41 in the rearward and upward direction. The second stopper 58B restricts the pivoting angle of the side stand 41 in the downward direction. The first stopper 58A and the second stopper 58B are respectively formed to protrude from both sides of an outer circumferential end face 54f of the support plate portion 54a in the circumferential direction toward the outer circumferential side.

As shown in FIGS. 2 and 3, when the base end portion 41a abuts the first stopper 58A, the side stand 41 is in a state in which the pivoting angle in the rearward and upward direction is restricted (a retracted state). At this time, the side stand 41 has an inclined posture in which the tip portion 41b is positioned on a rear portion of a side of the vehicle body and above the base end portion 41a. When the base end portion 41a abuts the second stopper 58B, the side stand 41 is in a state in which the pivoting angle in the downward direction is restricted (a standing state). At this time, the side stand 41 extends obliquely downward and outward in the vehicle width direction from the base end portion 41a to the tip portion 41b. In this state, by inclining the vehicle body of the motorcycle 1 to the left, the ground contact portion 41s of the side stand 41 comes into contact with the ground, so that the vehicle body of the motorcycle 1 is supported in the state in which it is inclined to the left.

The stand connecting portion 54 has the spring locking portion 57. The spring locking portion 57 is provided to extend upward from the back of the first stopper 58A. The spring locking portion 57 is provided to extend upward and inward in the vehicle width direction from the back of the first stopper 58A. The other end 42b of the return spring 42 is locked to a locking pin portion 57f provided at a tip of the spring locking portion 57. The spring locking portion 57 holds the side stand 41 in the retracted state or the standing state via the return spring 42. Since the spring locking portion 57 is provided to extend upward and inward in the vehicle width direction, the spring locking portion 57 does not easily interfere with the rider's foot when the rider places his or her foot on the step 30.

<Protecting Portion>

As shown in FIGS. 5 to 9, the stand connecting portion 54 has a protecting portion (a protecting wall) 56 which stands upright outward in the vehicle width direction from an outer side surface of the second stopper 58B.

With the side stand bracket 50 attached to the vehicle body frame 5, the protecting portion 56 is provided behind the frame fixing portion 52 and the step support portion 53 in the vehicle and is provided in front of the support plate portion 54a of the stand connecting portion 54 in the vehicle.

The protecting portion 56 protrudes outward in the vehicle width direction from a side surface portion 54d of the stand connecting portion 54 and has a wall shape extending in the vertical direction. The protecting portion 56 has front and rear surfaces substantially parallel to the vehicle width direction and has a thickness direction orthogonal to the front and rear surfaces and inclined upward toward the forward direction. In a front view, the protecting portion 56 has a trapezoidal shape in which a vertical width thereof decreases from a base portion 56a on the inner side in the vehicle width direction toward a tip portion 56b on the outer side in the vehicle width direction. The protecting portion 56 has a thickness increasing toward the base portion 56a.

A reinforcing rib 56r is provided between the front surface of a lower end portion of the protecting portion 56 and the side surface portion 54d of the stand connecting portion 54.

Here, the extension portion 55 has an upper reinforcing rib 55r1, a middle reinforcing rib 55r2, and a lower reinforcing rib 55r3 which cross from the step bracket 51b to the stand bracket main body 51a on the outer side in the vehicle width direction. The middle reinforcing rib 55r2 reinforces the protecting portion 56 together with the reinforcing rib 56r by connecting its rear end to the protecting portion 56.

Figure 9:
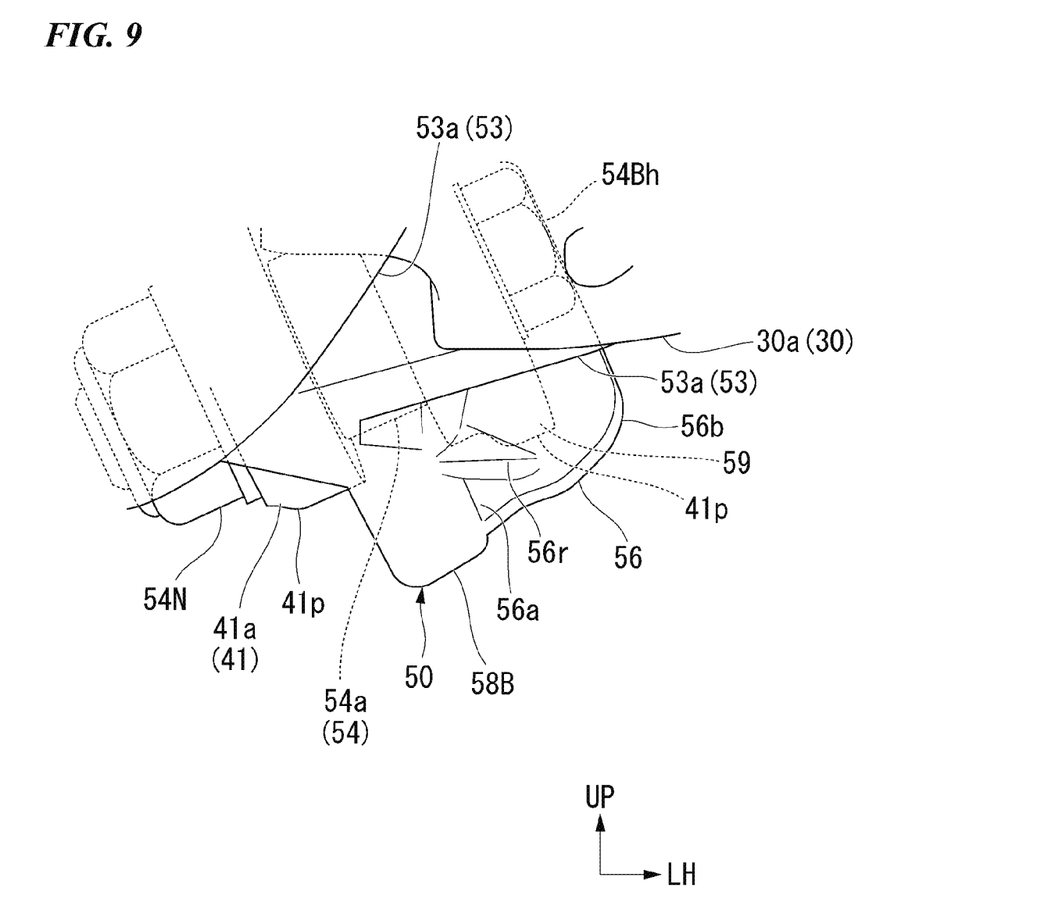
FIG. 9 is an explanatory view showing the positional relationship between a protecting portion provided in the side stand bracket, a stand connecting portion and a base end portion of the side stand from the front side of the vehicle (in a direction of an arrow X1 in FIG. 3).

As shown in FIG. 9, in the retracted state of the side stand 41, most of the plate portion 41p on the outer side in the vehicle width direction of the base end portion 41a of the side stand 41 connected to the stand connecting portion 54 overlaps the step 30 and the step support portion 53 when viewed from the front side of the vehicle. However, a lower portion of the plate portion 41p forms a projecting portion 59 not overlapping the step 30 and the step support portion 53. The protecting portion 56 protrudes from the stand connecting portion 54 so as to cover and protect the projecting portion 59 in a front view.

The protecting portion 56 is provided such that at least a part thereof overlaps the projecting portion 59 of the plate portion 41p outside the base end portion 41a of the side stand 41 when viewed from the front side of the vehicle.

The protecting portion 56 is preferably provided to overlap the entire projecting portion 59 when viewed from the front side of the vehicle. As a result, the projecting portion 59 is protected from disturbances from the front side of the vehicle (for example, contact, collision or the like with a road surface and obstacles while traveling).

When viewed from the front side of the vehicle, the protecting portion 56 protrudes below the projecting portion 59 and outward (leftward) in the vehicle width direction. In particular, the protecting portion 56 protrudes below the projecting portion 59 so as to protect the projecting portion 59 from a grand hit and collision with obstacles or the like on the ground.

Figure 10:
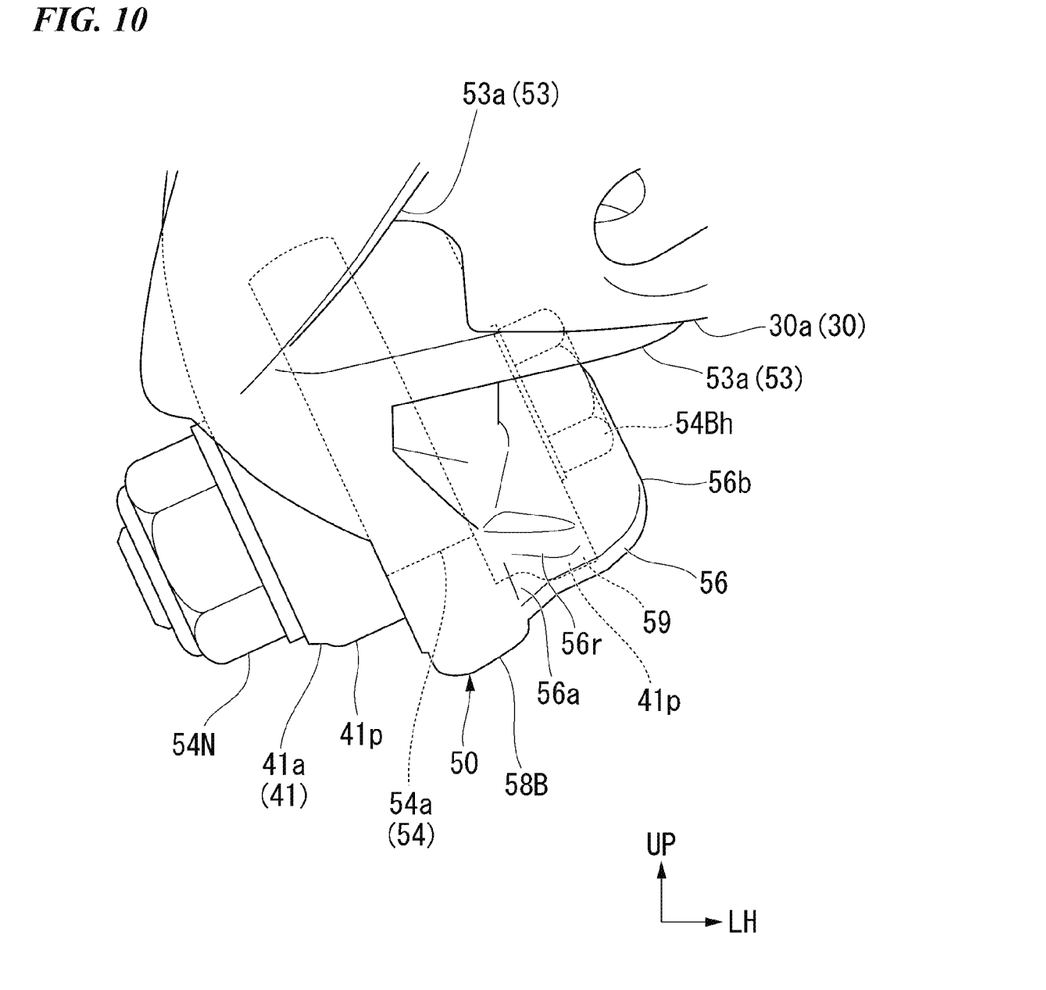
FIG. 10 is an explanatory view showing the positional relationship between the protecting portion provided in the side stand bracket, the stand connecting portion and the base end portion of the side stand obliquely from below (in a direction of an arrow X2 in FIG. 3).

FIG. 9 corresponds to a front view of the motorcycle 1 in empty state 1G On the other hand, FIG. 10 corresponds to a front view of a vehicle posture of the motorcycle 1 of which a front suspension is in empty state 1G and a rear suspension is in full flex (full stroke) state. Also in the front view of FIG. 10, the protecting portion 56 is provided to overlap the entire projecting portion 59 in a front view. In FIG. 10, a head 54Bh of the pivot bolt 54B also projects while avoiding the step 30 and the step support 53 in a front view. The protecting portion 56 is provided to overlap the entire projecting portion mentioned above as well in a front view. Thus, even when the motorcycle 1 lands after jumping, the protecting portion 56 can protect parts to be protected.

As described above, in the motorcycle 1 according to the embodiment, the side stand bracket 50 includes the stand connecting portion 54 to which the base end portion 41a of the side stand 41 is rotatably connected, and the protecting portion 56 which is provided in front of the stand connecting portion 54 in the vehicle and protects the base end portion 41a of the side stand 41.

According to this configuration, by providing the protecting portion 56 protecting the base end portion 41a of the side stand 41 in front of the stand connecting portion 54 in the vehicle, the base end portion 41a of the side stand 41 is protected from disturbances from the front side of the vehicle front. Accordingly, the base end portion 41a of the side stand 41 can be inhibited from being worn or damaged by disturbances from the front side of the vehicle. Therefore, it is possible to inhibit occurrence of troubles in pivoting operation of the side stand 41 or requiring replacement of components so that reliability and durability of the motorcycle 1 can be enhanced.

Also, the protecting portion 56 protrudes outward in the vehicle width direction from the side surface portion 54d of the side stand bracket 50 and is provided to overlap the base end portion 41a of the side stand 41 when viewed from the front side of the vehicle. The protecting portion 56 preferably has a wall shape that protrudes outward in the vehicle width direction from the side surface portion 54d of the side stand bracket 50 and is provided to overlap the entire outer side portion of the base end portion 41a of the side stand 41 in the vehicle width direction when viewed from the front side of the vehicle. As a result, the base end portion 41a of the side stand 41 can be reliably protected. By forming the protecting portion 56 in a wall shape, the base end portion 41a of the side stand 41 can be securely protected.

In addition, the protecting portion 56 is provided behind the step support portion 53 in the vehicle and is disposed below the upper surface 30t of the step 30. Thus, the protecting portion 56 hardly interferes with the rider's foot when the rider places the foot on the step 30 so that impairment in operability of the motorcycle 1 can be inhibited.

Moreover, the side stand bracket 50 can reduce the number of components by having the stand bracket main body 51a and the step bracket 51b integrally, as compared with the case where these are separately provided.

Further, since the outer side portion of the base end portion 41a of the side stand 41 has the projecting portion 59 which does not overlap the step 30 and the step support portion 53 when viewed from the front side of the vehicle and the protecting portion 56 protects the projecting portion 59 (overlaps the projecting portion 59 in a front view). Thus, the base end portion 41a of the side stand 41 can be protected efficiently.

Furthermore, the pivot shaft 54s of the side stand 41 is disposed below the upper surface 30t of the step 30 and inside the step 30 in the vehicle width direction when viewed from the front side of the vehicle and is inclined at an angle within a range in which the extension line 54c1 of the central axis 54c thereof intersects the upper surface 30t of the step 30 so that the inclination of the pivot shaft 54s with respect to the horizontal direction is restricted. Therefore, a pivoting trajectory of the side stand 41 is inhibited from excessively intruding into the vehicle body side when the side stand 41 is folded up, so that the nearing of the side stand 41 toward the vehicle body side can be inhibited even in the case in which the folding angle of the side stand 41 is set to be larger.

Also, the present invention is not limited to the above-described embodiments described with reference to the drawings, and various modifications can be considered within the technical scope thereof.

For example, although the side stand bracket 50 has been provided on the left pivot frame 9, the present invention is not limited thereto. For example, the side stand bracket 50 may be provided on the left lower frame 12. The side stand bracket 50 may be fixed to the vehicle body frame 5 by welding or the like. The side stand bracket 50 may be separate from the step bracket 51b. The present invention is also applicable when the side stand is installed on the right side of the vehicle body.

Also, the protecting portion 56 may be a structure which protects (covers) the base end portion 41a of the side stand 41 from the front side of the vehicle as well as further from the other direction. For example, the protecting portion 56 may be provided to cover the base end portion 41a of the side stand 41 from the other direction such as the upper side and the outer side in the vehicle width direction in addition to the front side of the vehicle. The protecting portion 56 is not limited to the wall shape overlapping the entire parts to be protected in a front view, and may be a wall shape partially overlapping in a front view or may be a protruding shape or a frame shape, which projects outward and downward in the vehicle width direction with respect to parts to be protected in a front view, other than the wall shape.

The saddle-riding type vehicle includes all vehicles on which the driver straddles the vehicle body, and not only motorcycles (including motor bikes and scooter type vehicles), but three wheel vehicles (including two front and one rear wheel vehicles in addition to one front and two rear wheel vehicles) or four wheel vehicles are also included, and vehicles including an electric motor as a prime mover are also included.

Also, it should be understood that the configuration in the above-mentioned embodiment is an example of the present invention, and various modifications are possible in the range of not departing from the gist of the present invention.

What is claimed is:

1. A saddle-riding type vehicle comprising:
a vehicle body frame;
a side stand bracket provided at a lower portion of one side of the vehicle body frame in a vehicle width direction; and
a side stand supported by the side stand bracket,
wherein the side stand bracket includes:

a stand connecting portion to which a base end portion of the side stand is pivotably connected;
a spring engaging portion configured to hold a tip portion of the side stand via a biasing member at a rear portion of a side of a vehicle body above the base end portion;
a stopper configured to restrict a pivoting angle of the side stand in a downward direction; and
a protecting portion which is provided in front of the stand connecting portion, stands upright outward in the vehicle width direction from an outer side surface of the stopper, and protects the base end portion of the side stand.

2. The saddle-riding type vehicle according to claim 1, wherein the protecting portion protrudes has front and rear surfaces substantially parallel to the vehicle width direction and has a wall shape extending in a vertical direction, and
a reinforcing rib is provided between a front surface of the protecting portion and a side surface portion of the stand connection portion.

3. The saddle-riding type vehicle according to claim 1, further comprising:
a pivot bolt configured to rotatably connect the side stand to the side stand bracket, wherein the protecting portion has a wall shape extending in a vertical direction, is provided to overlap a head of the pivot bolt in the vertical direction, and stands upright outward in the vehicle width direction to reach a tip of the head.

4. The saddle-riding type vehicle according to claim 1, wherein the protecting portion protrudes outward in the vehicle width direction from a side surface portion of the side stand bracket and is provided in a wall shape which overlaps the base end portion of the side stand when viewed from a front side of the vehicle.

5. The saddle-riding type vehicle according to claim 1, further comprising:
a step on which a rider's foot is placed,
a step bracket supporting the step, wherein the side stand bracket has a stand bracket main body integrally with the step bracket.

6. A saddle-riding type vehicle comprising:
a vehicle body frame;
a side stand bracket provided at a lower portion of one side of the vehicle body frame in a vehicle width direction; and
a side stand supported by the side stand bracket,
wherein the side stand bracket includes:
a stand connecting portion to which a base end portion of the side stand is pivotably connected;
a spring engaging portion configured to hold a tip portion of the side stand via a biasing member at a rear portion of a side of a vehicle body above the base end portion;
a protecting portion which is provided in front of the stand connecting portion and protects the base end portion of the side stand;
a step on which a rider's foot is placed; and
a step bracket supporting the step,
wherein the step bracket includes a step support portion supporting the step in front of the base end portion of the side stand,
the base end portion of the side stand has a projecting portion which does not overlap the step and the step support portion when viewed from the front side of the vehicle, and
the protecting portion protects the projecting portion.

7. The saddle-riding type vehicle according to claim 1, further comprising:
a step on which a rider's foot is placed,
wherein a pivot shaft of the side stand is disposed below an upper surface of the step and inside the step in the vehicle width direction when viewed from the front side of the vehicle, and an extension line of central axis of the pivot shaft is inclined at an angle within a range intersecting the upper surface of the step.

8. The saddle-riding type vehicle according to claim 2, further comprising:
a pivot bolt configured to rotatably connect the side stand to the side stand bracket, wherein the protecting portion has a wall shape extending in a vertical direction, is provided to overlap a head of the pivot bolt in the vertical direction, and stands upright outward in the vehicle width direction to reach a tip of the head.

9. The saddle-riding type vehicle according to claim 2, wherein the protecting portion protrudes outward in the vehicle width direction from a side surface portion of the side stand bracket and is provided in a wall shape which overlaps the base end portion of the side stand when viewed from a front side of the vehicle.

10. The saddle-riding type vehicle according to claim 3, wherein the protecting portion protrudes outward in the vehicle width direction from a side surface portion of the side stand bracket and is provided in a wall shape which overlaps the base end portion of the side stand when viewed from a front side of the vehicle.

11. The saddle-riding type vehicle according to claim 2, further comprising:
a step on which a rider's foot is placed,
wherein a pivot shaft of the side stand is disposed below an upper surface of the step and inside the step in the vehicle width direction when viewed from the front side of the vehicle, and an extension line of central axis of the pivot shaft is inclined at an angle within a range intersecting the upper surface of the step.

12. The saddle-riding type vehicle according to claim 3, further comprising:
a step on which a rider's foot is placed,
wherein a pivot shaft of the side stand is disposed below an upper surface of the step and inside the step in the vehicle width direction when viewed from the front side of the vehicle, and an extension line of central axis of the pivot shaft is inclined at an angle within a range intersecting the upper surface of the step.

13. The saddle-riding type vehicle according to claim 6, further comprising:
a step on which a rider's foot is placed,
wherein a pivot shaft of the side stand is disposed below an upper surface of the step and inside the step in the vehicle width direction when viewed from the front side of the vehicle, and an extension line of central axis of the pivot shaft is inclined at an angle within a range intersecting the upper surface of the step.

14. A side stand bracket provided on a vehicle body frame of a saddle-riding type vehicle, comprising:
a stand connecting portion to which a base end portion of a side stand is rotatably connected;
a stopper configured to restrict a pivoting angle of the side stand in a downward direction; and
a protecting portion which is provided in front of the stand connecting portion when attached to the vehicle body frame, stands upright outward in the vehicle width direction from an outer side surface of the stopper, and protects the base end portion of the side stand connected to the stand connecting portion.

* * * * *